(12) United States Patent
Ruetten et al.

(10) Patent No.: US 10,119,851 B2
(45) Date of Patent: Nov. 6, 2018

(54) CORIOLIS FLOW METER FOR MEASURING PROPERTIES OF A FLUID AND METHOD THEREFOR

(71) Applicant: General Electric Company, Schenectady, NY (US)

(72) Inventors: Jens Ruetten, Bayern (DE); Philipp Lang, Bayern (DE); Charles Erklin Seeley, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/384,771

(22) Filed: Dec. 20, 2016

(65) Prior Publication Data

US 2018/0171281 A1    Jun. 21, 2018

(51) Int. Cl.
    *G01F 1/84* (2006.01)
(52) U.S. Cl.
    CPC .......... *G01F 1/8413* (2013.01); *G01F 1/8431* (2013.01)
(58) Field of Classification Search
    CPC .................................................. G01F 1/84
    See application file for complete search history.

(56) References Cited

U.S. PATENT DOCUMENTS

| | | |
|---|---|---|
| 4,793,191 A | 12/1988 | Flecken et al. |
| 4,801,897 A | 1/1989 | Flecken |
| 4,955,239 A | 9/1990 | Cage et al. |
| 5,386,732 A | 2/1995 | Scotto |
| 6,748,813 B1 | 6/2004 | Barger et al. |
| 7,073,396 B2 | 7/2006 | Hussain et al. |
| 7,874,220 B2 | 1/2011 | Guntur et al. |
| 2005/0284815 A1 | 12/2005 | Sparks et al. |
| 2011/0154912 A1 | 6/2011 | Kumar et al. |
| 2012/0186363 A1 | 7/2012 | Egner et al. |
| 2013/0124131 A1 | 5/2013 | Murakami et al. |
| 2015/0323486 A1 | 11/2015 | Schick et al. |
| 2016/0313240 A1 | 10/2016 | Ehring |
| 2017/0356777 A1* | 12/2017 | Zhu ........................ G01F 1/8413 |

OTHER PUBLICATIONS

Zamora et al., "An FPGA Implementation of a Digital Coriolis Mass Flow Metering Drive System", IEEE Transactions on Industrial Electronics, Jul. 2008, vol. 55, Issue 7, pp. 2820-2831.

(Continued)

*Primary Examiner* — Jewel V Dowtin
(74) *Attorney, Agent, or Firm* — GE Global Patent Operation; Douglas D. Zhang

(57) ABSTRACT

A Coriolis flow meter for measuring one or more properties of a fluid is described herein which involves a modular configuration, and includes a fluid flow sub-system and a mechanical oscillator sub-system, both functionally separate, and are coupled in a closed loop arrangement, such that the flow conduit is not directly vibrated, and instead receives induced oscillations from the mechanical oscillator sub-system. The Coriolis flow meter is useful for high purity applications, as well as for the bioprocessing applications. Bioprocessing systems incorporating the Coriolis flow meter are also described herein. Method for measuring one or more properties of a fluid using the disclosed Coriolis flow meter are also described herein.

31 Claims, 13 Drawing Sheets

(56) References Cited

OTHER PUBLICATIONS

Alveringha et al., "Improved Capacitive Detection Method for Coriolis Mass Flow Sensors Enabling Range/Sensitivity Tuning", Microelectronic Engineering, Science Direct, Jan. 28, 2016, vol. 159, pp. 1-5.
"Coriolis Mass Flowmeter Technology", Universal Flow Monitors Inc, http://www.flowmeters.com/coriolis-mass-technology, 2016, 2 Pages.
International Search Report and Written Opinion issued in connection with corresponding Application No. PCT/EP2017/083237 dated Jun. 7, 2018.

* cited by examiner

CORIOLIS FLOW METER FOR MEASURING PROPERTIES OF A FLUID AND METHOD THEREFOR

BACKGROUND

This disclosure relates generally to a Coriolis flow meter for measuring one or more properties of a fluid including fluid flow, and more particularly to a Coriolis flow meter where the fluid flow sub-system is functionally separate from the mechanical oscillator sub-system, and even more particularly to a Coriolis flow meter for use in a bioprocessing system.

Coriolis flow meters are used to measure mass flow of fluids flowing through a pipeline in different industrial process engineering environments. Coriolis flow meters have one or more flow tubes, each having a set of natural vibration modes which may be of a simple bending, torsional, or twisting type. Each material filled flow tube is driven to oscillate at resonance in one of these natural vibration modes. The natural vibration modes are defined in part by the combined mass of the flow tubes and the material within the flow tubes. In most Coriolis flow meters, the fluid flows into the Coriolis flow meter from a connected pipeline on the inlet side. The fluid is then directed through the flow tube or flow tubes and delivered to a pipeline connected on the outlet side.

Typically, the flow tube is oscillated using electromagnetic excitation. When there is no flow through the Coriolis flow meter, all points along a flow tube oscillate with an identical phase. As the material begins to flow, Coriolis accelerations cause each point along the flow tube to have a different phase with respect to other points along the flow tube. Motion sensors on the flow tube produce sinusoidal signals representative of the motion of the flow tube. The phase difference between the sensor signals is proportional to the mass flow rate of the material flowing through the flow tube or flow tubes.

Most Coriolis flow meters are made of metal such as aluminum, steel, stainless steel and titanium. It is known to use Coriolis flow meters having different flow tube configurations. Among these configurations are single tube, dual tubes, straight tube, curved tube, and flow tubes of irregular configuration. The flow tubes also function as a mechanical oscillator.

In these prior art Coriolis flow meters, the frequency range of the oscillation modes is therefore dominated by the design and material of the flow tube, and therefore, choice of material, geometry and thickness of the flow tube has to be tailored to composition, pressure and temperature range, or other such properties of the fluid under test.

BRIEF DESCRIPTION

In one aspect, a Coriolis flow meter for measuring one or more properties of a fluid is disclosed. The fluid flow sub-system is configured to provide a flow path for the fluid, and a mechanical oscillator sub-system is disposed in proximity to the fluid flow sub-system, where the mechanical oscillator sub-system and the fluid flow sub-system are functionally separate.

The mechanical oscillator sub-system is configured to induce oscillations in the fluid flow sub-system, and further configured to detect a Coriolis response from the fluid. The mechanical oscillator sub-system includes a mechanical oscillator, linked with the fluid flow sub-system, and configured to provide a closed-loop arrangement for transmission of oscillations to the fluid and receipt of the Coriolis response from the fluid. The mechanical oscillator sub-system also includes one or more actuators for generating oscillations in the mechanical oscillator, and a sensing sub-system configured to receive the Coriolis response through the mechanical oscillator from the fluid.

The Coriolis flow meter also includes an electronics circuitry coupled to the mechanical oscillator sub-system, and configured to trigger the one or more actuators and the sensing sub-system, and configured to process the Coriolis response received from the sensing sub-system to generate one or more measurements representative of one or more fluid properties of the fluid.

In another aspect, a bioprocessing system for monitoring one or more fluid properties of a fluid used in a bioprocess unit is disclosed. The bioprocessing system includes an inlet tubing and an outlet tubing of the bioprocess unit, where the inlet tubing is connected to an inlet process connect, and the outlet tubing is connected to an outlet process connect. The bioprocessing system includes the Coriolis flow meter described hereinabove, coupled to the inlet process connect and the outlet process connect, and a monitoring unit configured for receiving the measurements representative of the one or more fluid properties of the fluid, and configured to use the measurements to control the bioprocess.

In yet another aspect, a bioprocessing system for monitoring one or more fluid properties of a fluid used in a bioprocess unit is disclosed, where the bioprocess unit includes a fluid flow sub-system for transferring a fluid in a bioprocess of the bioprocess unit. The fluid flow sub-system is shared with the other components of the Coriolis flow meter described herein above. In other words, the fluid flow sub-system is common to the bioprocess unit and the Coriolis flow meter. The bioprocessing system includes a monitoring unit configured for receiving the measurements representative of the one or more fluid properties of the fluid, and configured to use the measurements to control the bioprocess.

In yet another aspect, a method for measuring one or more fluid properties of a fluid using a Coriolis flow meter is described herein. The method includes the steps for providing a fluid flow sub-system to retain a fluid in a flow conduit; providing a mechanical oscillator sub-system described herein above, and providing an electronics circuitry coupled to the mechanical oscillator sub-system. The method includes a step for transmitting an electrical signal to trigger oscillations in the fluid through the mechanical oscillator sub-system; a step for receiving a Coriolis response from the fluid through the mechanical oscillator sub-system; and a step for processing the Coriolis response to obtain one or more measurements representative of the one or more fluid properties of the fluid.

In yet another aspect, a method for monitoring one or more fluid properties of a fluid in a bioprocess of a bioprocessing system is described herein. The method includes coupling an inlet tubing and an outlet tubing of a bioprocess with a Coriolis flow meter described hereinabove using process connects, transmitting an electrical signal to trigger oscillations in the fluid through the mechanical oscillator sub-system; receiving a Coriolis response from the fluid through the mechanical oscillator sub-system; processing the Coriolis response to obtain one or more measurements representative of the one or more fluid properties of the fluid; and monitoring the bioprocess using the one or more measurements. The one or more fluid properties comprise at least one of mass flow rate, density, or temperature of the fluid.

DRAWINGS

These and other features, aspects, and advantages of the present invention will become better understood when the following detailed description is read with reference to the accompanying drawings in which like characters represent like parts throughout the drawings, wherein.

Figure 2:
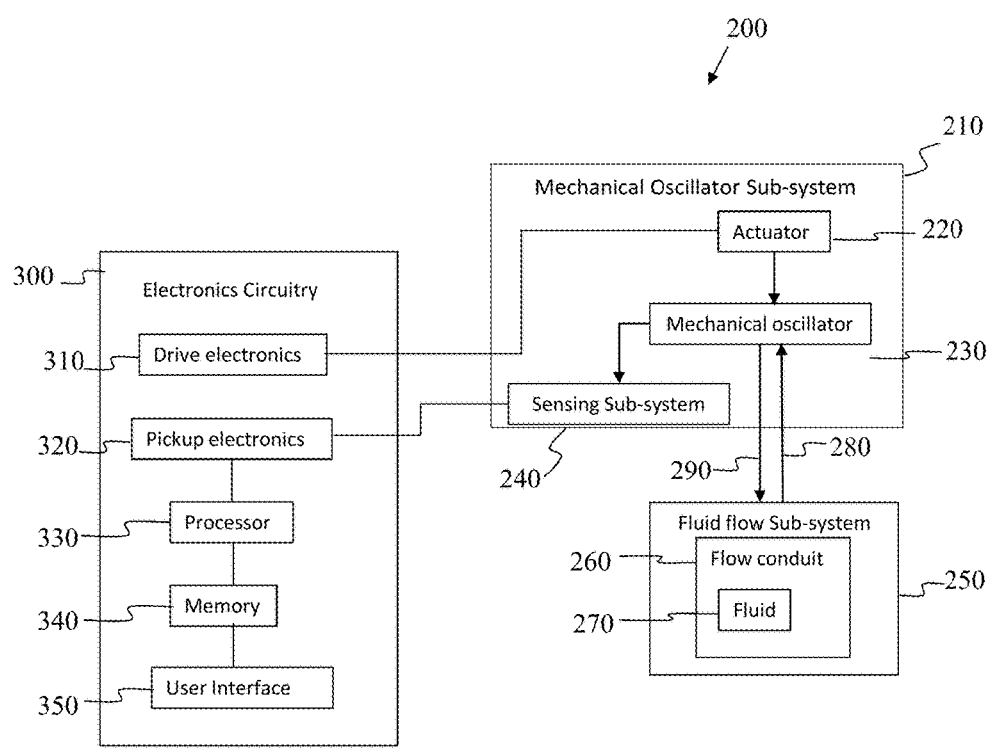
FIG. 2 is a block diagram representation of an embodiment of the Coriolis flow meter in accordance with some embodiments.
Figure 12:
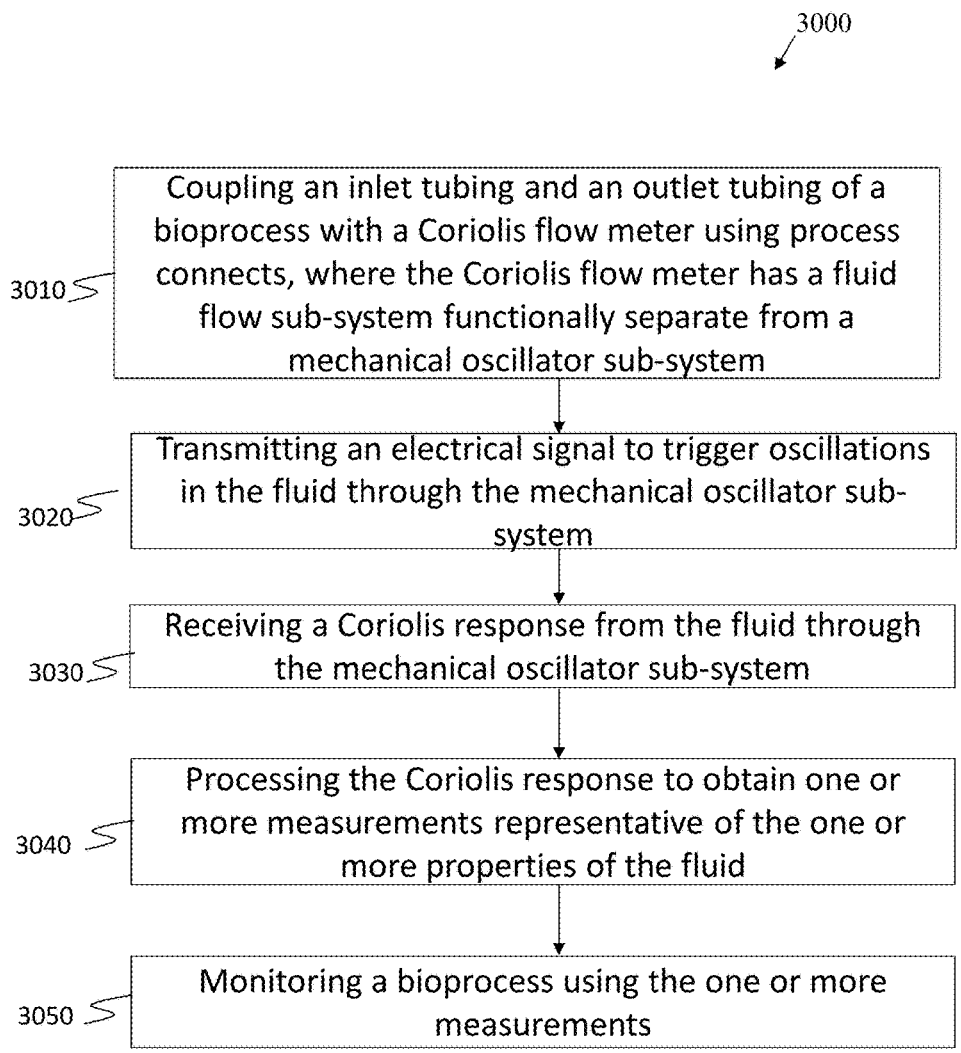
Figure 13:
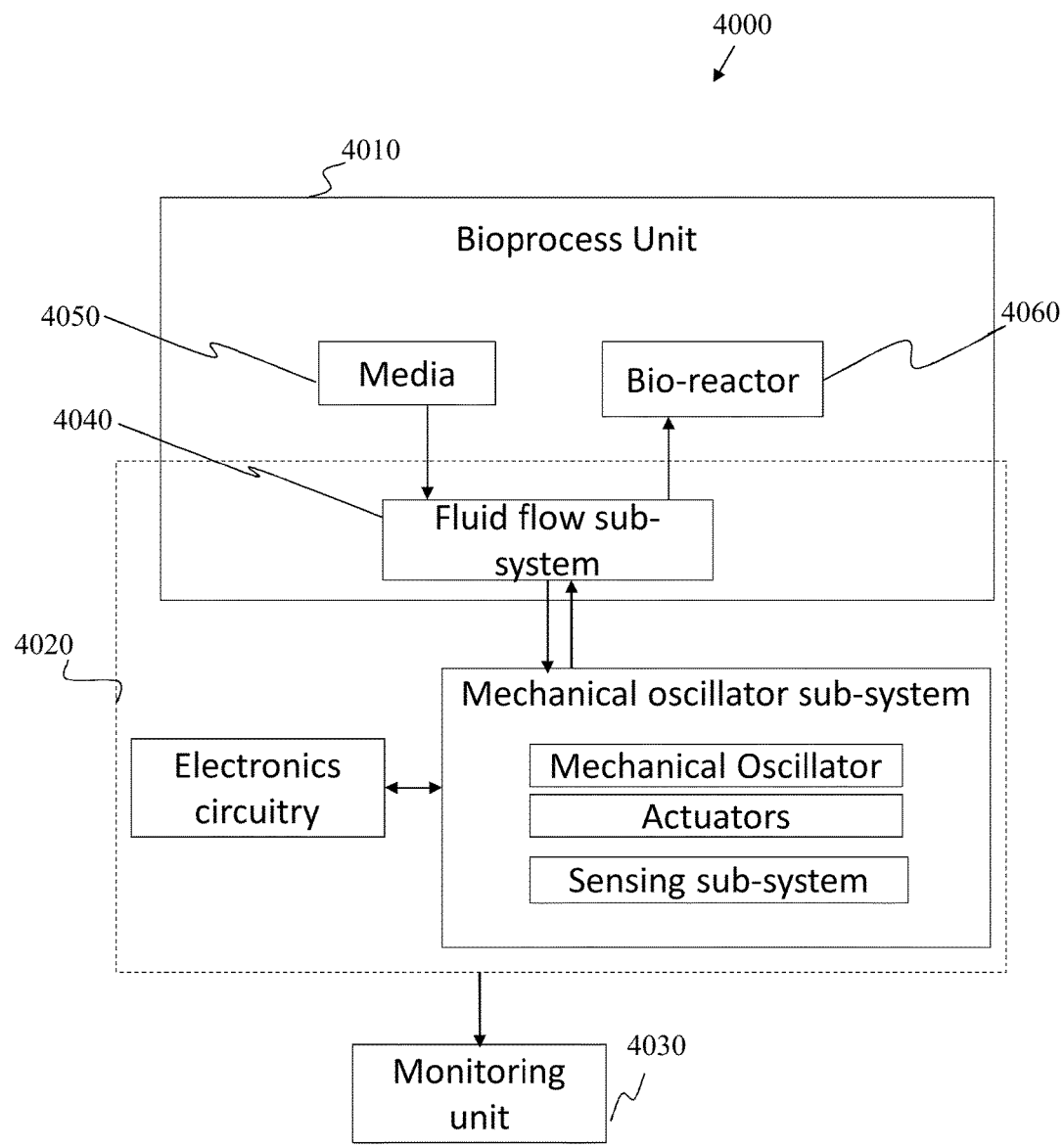

FIG. 12 illustrates a flowchart showing steps for a method for measuring one or more properties of a fluid including fluid flow in a bioprocess of a bioprocessing system, in accordance with some embodiments; and FIG. 13 illustrates a block diagram representation of another embodiment of a bioprocessing system that shares a fluid flow sub-system with the Coriolis flow meter of FIG. 2, in accordance with some embodiments.

DETAILED DESCRIPTION

As mentioned hereinabove, a Coriolis flow meter is used for measuring fluid and fluid flow properties in a process in any processing system that uses fluids, such as a bioprocessing system. The different embodiments presented herein describe advantageous features for the Coriolis flow meter that alleviate constraints related to the choice of applicable materials and manufacturing processes required for manufacturing the Coriolis flow meter.

The embodiments described herein are useful for measurements of fluid properties such as mass flow rates, density, temperature, and the like, and are especially useful for several bioprocessing systems, that involve processes sensitive to contamination with both impurities as well as active biological material, as is common in the production in pharmaceuticals, and in cell biology.

Figure 1:
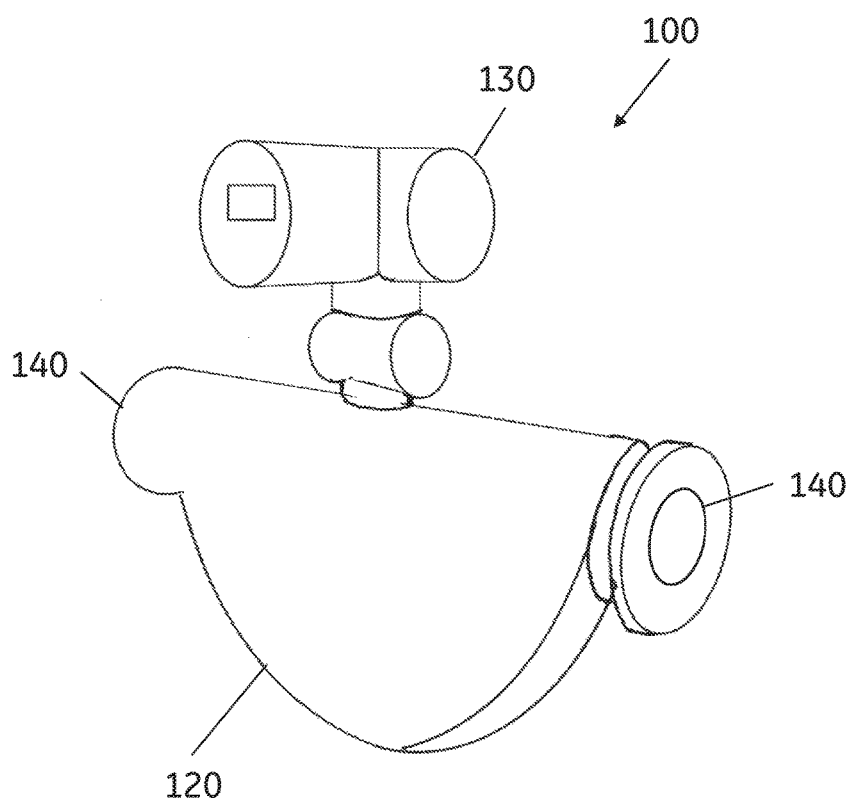
FIG. 1 is a diagrammatic representation of an embodiment of a Coriolis flow meter in accordance with some embodiments.

FIG. 1 is a diagrammatic representation of an embodiment of a Coriolis flow meter 100, having an enclosure 120 to house the mechanical oscillator sub-system, and the fluid flow sub-system; an enclosure 130 to house electronics circuitry that is used to operate the mechanical oscillator sub-system, and process connects 140 that connect to an inlet tubing and an outlet tubing (not shown) of a process in which the fluid and fluid flow is being monitoring, such as a bioprocess in a bioprocessing system. It may be appreciated by those skilled in the art that the embodiment of FIG. 1 is a non-limiting example of housing different components of the Coriolis flow meter 100, and based on the end use application the enclosures 120 and 130 and process connects 140 may be configured in a different manner.

FIG. 2 is a block diagram representation of an embodiment of the Coriolis flow meter 200 that includes a mechanical oscillator sub-system 210. The mechanical oscillator sub-system 210 includes one or more actuators 220, a mechanical oscillator 230 and a sensing sub-system 240. The one or more actuators 220 are used to induce oscillations of an appropriate amplitude over a required frequency range in the mechanical oscillator 230. The one or more actuators 220 may be directly coupled to the mechanical oscillator 230 (e.g. an electromagnetic coil), or may be indirectly coupled using external actuating components (e.g. a mechanical coupling, ferromagnetic parts, and the like). The sensing sub-system 240 includes pick-up sensors, for example, permanent magnet based sensors, or optical sensors, and associated components.

As shown in FIG. 2, the Coriolis flow meter 200 includes a fluid flow sub-system 250 that is functionally separate from the mechanical oscillator sub-system 210, and removes the constraints of the prior art where the fluid flow system itself is used as a mechanical oscillator, and both are functionally integral. Functionally separate herein implies that the fluid flow sub-system is a distinct component in itself, distinct from the mechanical oscillator sub-system.

The fluid flow sub-system 250 is configured to provide a flow path for the fluid 270 that is retained in a flow conduit 260. The flow conduit 260 is configured in a shape of commonly employed principles for Coriolis measurement, including but not limited to single, dual or multi loop configurations, split flow, straight tube, counter- or co-flow configurations. In some implementations, the flow conduit is made from, for example, polymer, whose influence on the oscillation modes (harmonic frequencies) of the mechanical oscillator is not dominant. The flow conduit material in some examples, is tailored to specific requirements of the bioprocessing application, such as temperature, pressure, and the characteristics of the fluid to be measured (e.g. mass flow rate, density, corrosivity etc). Furthermore, in some examples, the material of the flow conduit has a significantly lower stiffness than the material employed for the mechanical oscillator 230.

The mechanical oscillator sub-system 210 is disposed in proximity to the fluid flow sub-system 250, and the mechanical oscillator sub-system 210 is configured to induce oscillations in the fluid flow sub-system 250, and is further configured to detect a Coriolis response from the fluid 270. More specifically, the mechanical oscillator 230 is linked with the fluid flow sub-system 250 and is configured to provide a closed-loop arrangement for transmission of oscillations to the fluid 270 and receipt of the Coriolis response from the fluid 270.

In some implementations, the fluid flow sub-system 250 is directly coupled to the mechanical oscillator 230 body, such that the oscillations of the mechanical oscillator are applied to the flow conduit 250 and the fluid therein. Some examples of such implementations are shown in FIGS. 3-8.

The Coriolis flow meter 200 also includes an electronics circuitry 300 coupled to the mechanical oscillator sub-system 210. The electronics circuitry 300 includes drive electronics 310 to trigger the one or more actuator(s) 220 to generate oscillations in the mechanical oscillator 230 of the desired frequency and magnitude. The Coriolis flow meter 200 further includes pick-up electronics 320 to receive the Coriolis response from the sensing sub-system 240. The electronics circuitry 300 further includes a processor 330 to process the Coriolis response received from the sensing sub-system 240 to generate one or more measurements representative of one or more properties of the fluid including fluid flow. These measurements are displayed using a user interface 350. The electronics circuitry 300 also includes a memory 340 to store the measurements for further use and communication, to store data useful for the drive electronics 310, and the pick-up electronics 320.

Under operation, the electronics circuitry 300 triggers the one or more actuator(s) to generate oscillations in the mechanical oscillator 230, which are transferred to the fluid 270 in the flow conduit 260, as shown by arrow 290 in FIG. 2. Due to these oscillations, the Coriolis response (vibration amplitude and phase) is generated in the fluid and travels back to the mechanical oscillator 230, as shown by arrow 280, and is sensed by the sensing sub-system 240. The sensed Coriolis response is transmitted to the electronics circuitry 300 for further processing to obtain the measurements of the one or more properties of the fluid including fluid flow.

The configuration presented in FIG. 2 allows for functional separation of the mechanical oscillation sub-system from the fluid flow sub-system in the Coriolis flow meter. The functional separation extenuates the influence of material properties of the fluid flow sub-system on harmonic frequencies of oscillations that are used to generate the Coriolis response, which in turn is used for measurements of different properties of the fluid and fluid flow.

Separating the functions of the mechanical oscillation sub-system from the fluid flow sub-system, also allows for separate optimization of the materials for the mechanical flow sub-system and for the fluid flow sub-system, to achieve better product cost and unlocks potential for new applications which could not be addressed previously due to limitations of material choice.

The Coriolis flow meter described hereinabove and in the embodiments described herein after, has an advantage of having a modular construction, where the mechanical oscillator sub-system, and the fluid flow sub-system are functionally separate, as well as are modular and allow modular integration. The modular feature described herein provides advantages both from manufacturing aspects, and servicing aspects, and the functional separation provides technical advantages that ensures isolation of the fluid containment part that is encompassed in the fluid flow sub-system, from the mechanical oscillation sub-system.

The different embodiments of the Coriolis flow meter as described herein and its different components are described in more detail in reference to FIG. 3-FIG. 9.

Figure 3:
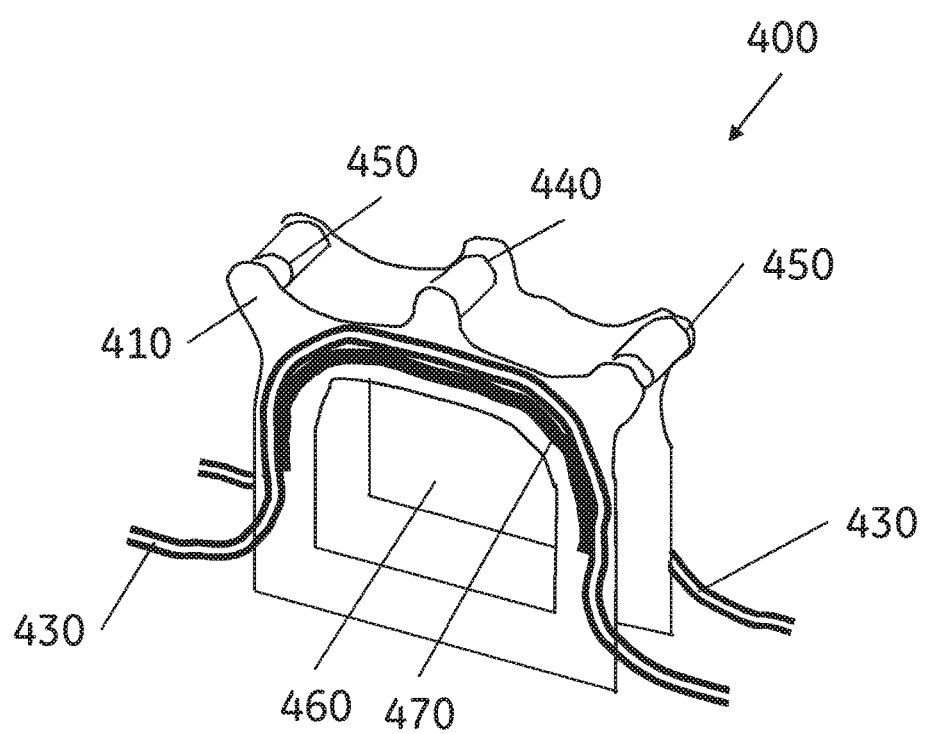
FIGS. 3-9 are diagrammatic representations of some example implementations of the Coriolis flow meter in accordance with some embodiments.

FIG. 3 is a diagrammatic representation of some components of a Coriolis flow meter 400. As shown, a mechanical oscillator 410 in this implementation is configured as a twin frame having an open profile 460, and providing a twin U-shape framework for the fluid flow sub-system 470 that includes a pair of flow conduits 430. An electromagnetic coil assembly 440 (electromagnet coil and permanent magnet) is used as the actuator, and pair of similar components 450 are used as sensors of the sensing sub-system 240 that are positioned to directly contact the mechanical oscillator 410.

Figure 4:
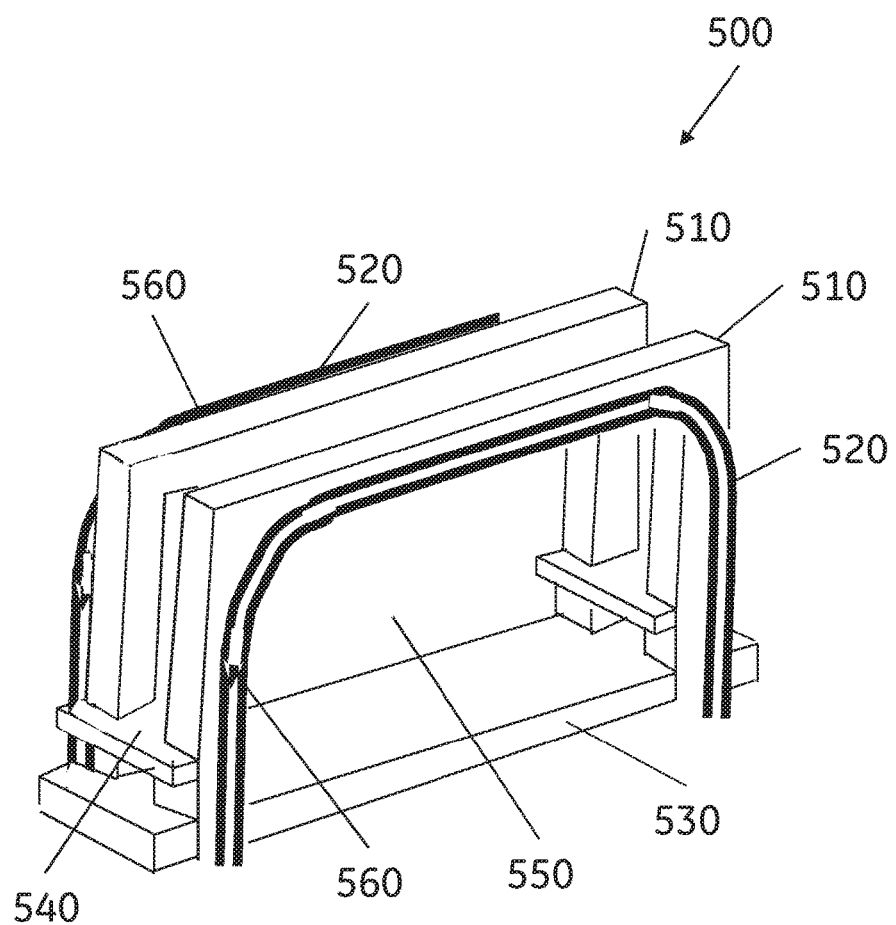

FIG. 4 is another diagrammatic representation of some components of a Coriolis flow meter 500. As shown, a mechanical oscillator 510 in this implementation is configured as paired rectangular frame having an open profile 550. The paired rectangular frame in one example is made from polycarbonate. A paired configuration of the fluid flow sub-system 520 is provided with respective flow conduits 560. The flow conduits in one example are made of silicone. A platform 530 is used to mount the mechanical oscillator 510 and the fluid flow sub-system 520. Brackets 540 are used to hold the mechanical oscillator 510. Other components of actuators and sensors may be provided in the same configuration as shown in FIG. 3, or mounted on the platform 530. In this example, the flow conduit is single use and disposable.

Figure 5:
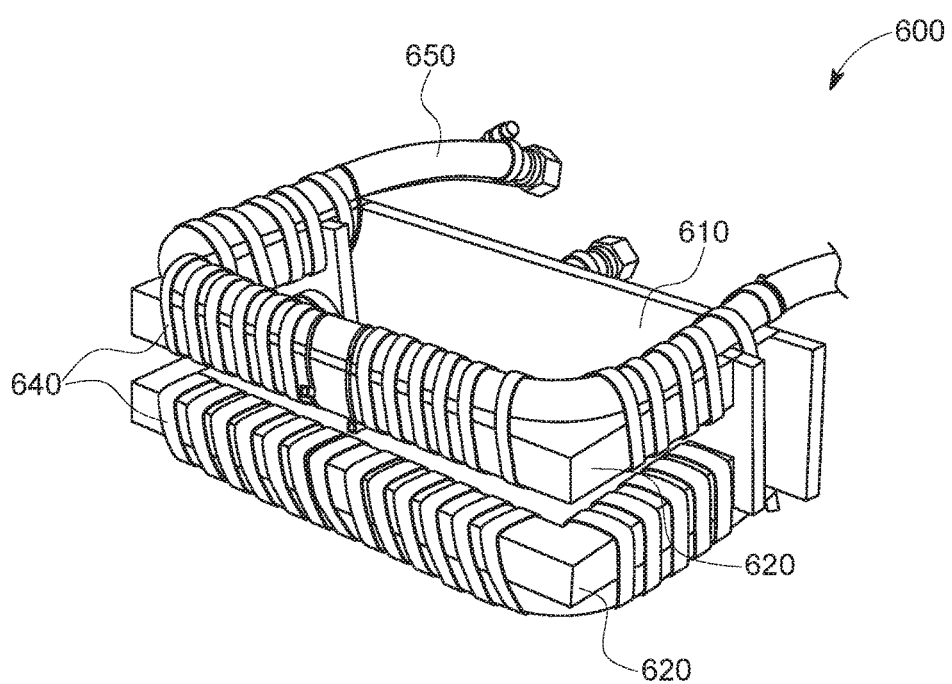

FIG. 5 is an experimental implementation of the configuration of FIG. 4 for implementing some components of a Coriolis flow meter 600. As shown, a mechanical oscillator 620 in this implementation is configured as paired rectangular frame having an open profile 610. A paired configuration of the flow conduits 650, is provided as a fluid flow sub-system, and a wire bundle wrap 640 is used to attach the flow conduit 650 to the mechanical oscillator 620. In this example, the flow conduit is single use and disposable.

Figure 6:
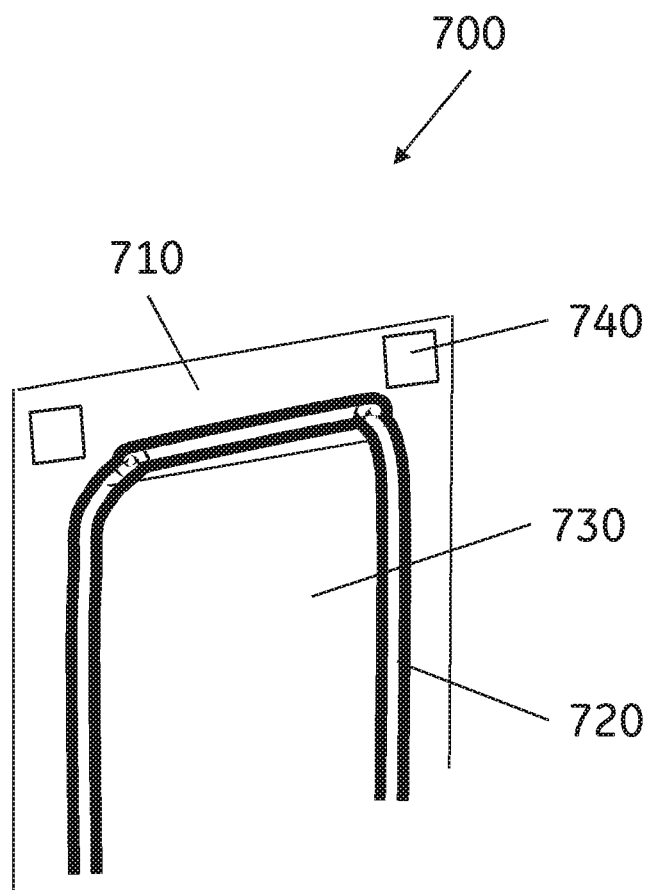

FIG. 6 is yet another configuration for implementing some components of a Coriolis flow meter 700. As shown, a mechanical oscillator 710 is configured as a singular frame having an open profile 730. A paired configuration of the flow conduits 720, is provided as a fluid flow sub-system. In this example, the mechanical oscillator 710 is made of sheet metal substrate, the flow conduit is made from hard plastic, and the pickup sensing has been realized by a non contact optical method, the laser sensor targeting the reflective patches 740 is not shown in the photograph.

Figure 7:
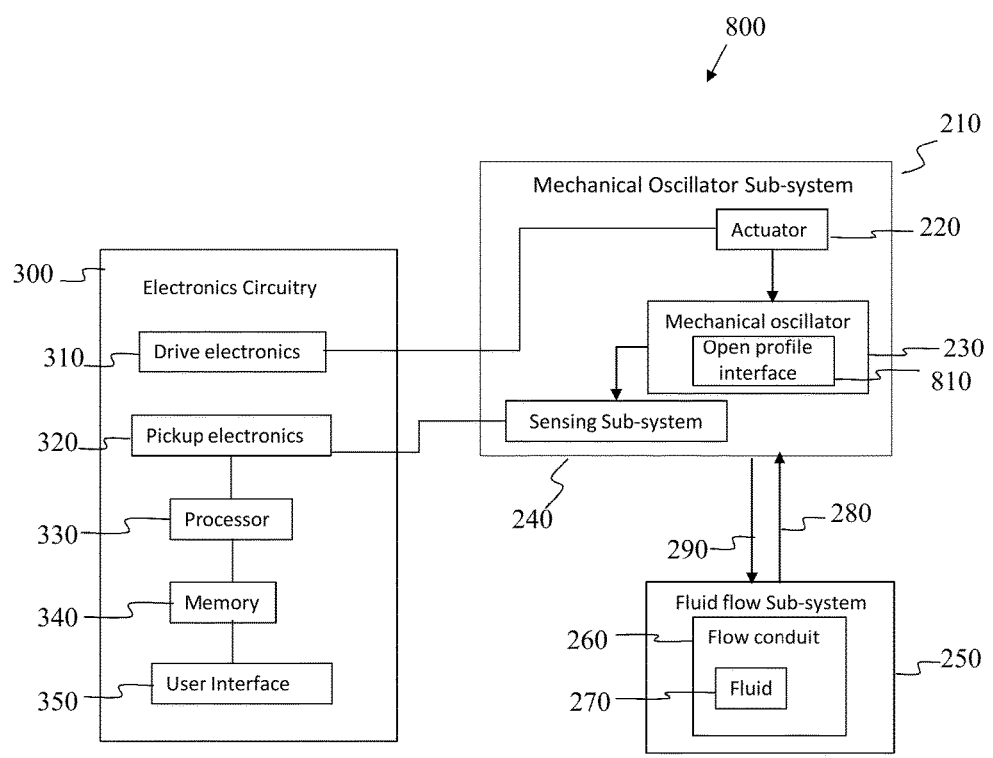

FIG. 7 is a diagrammatic representation of a Coriolis flow meter 800, which is similar to the Coriolis flow meter 200 of FIG. 2, with the additional feature of the open profile interface 810, that in some implementations, can be a separate part or component of the mechanical oscillator 230. The open profile interface advantageously links the fluid flow sub-system in a closed-loop arrangement to the mechanical oscillator sub-system described hereinabove.

Figure 8:
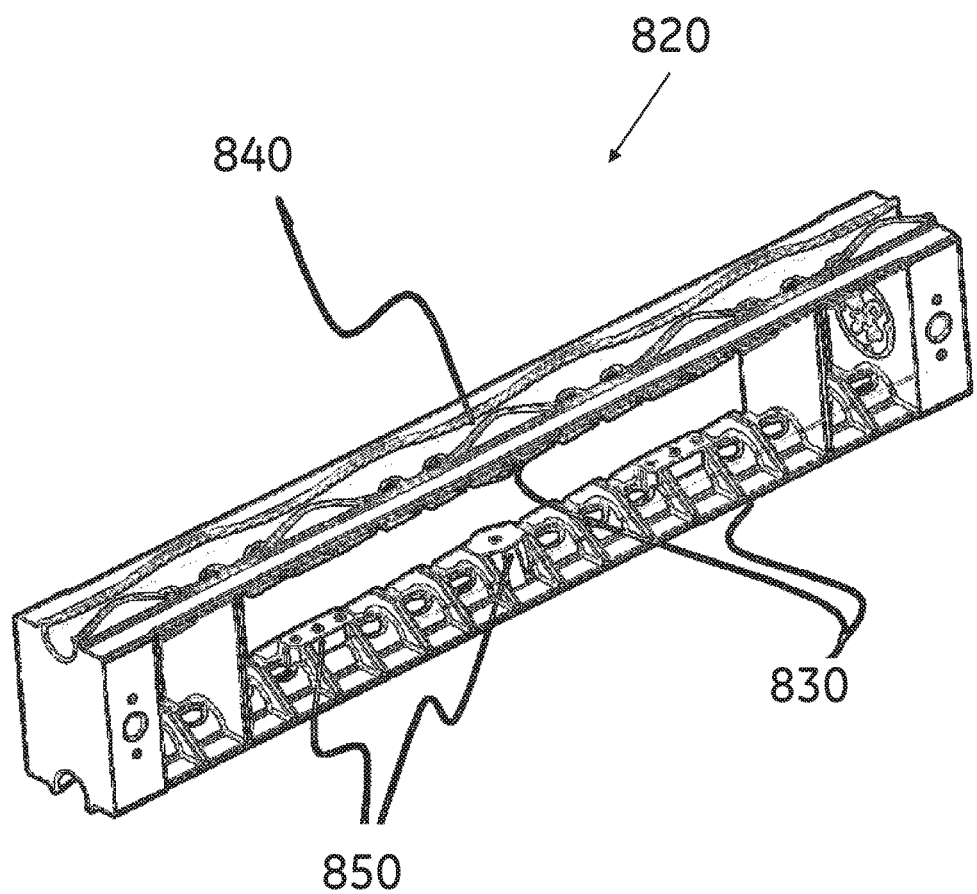
Figure 9:
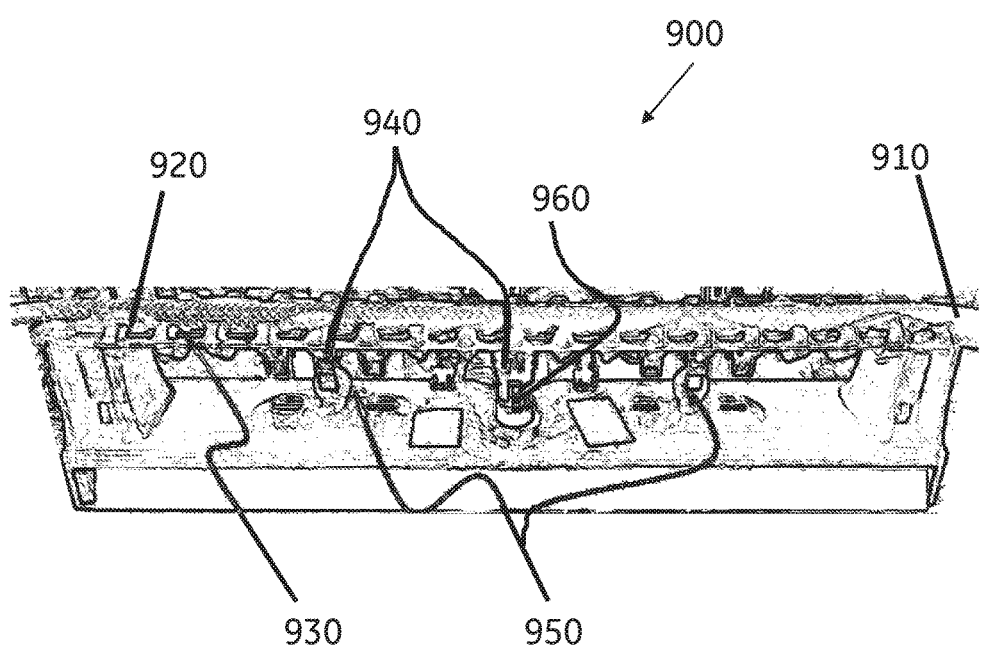

All other components of the Coriolis flow meter 800 of FIG. 7 are same as explained in reference with FIG. 2 embodiment. FIG. 8 and FIG. 9 are two example representations of the open profile interface 810 that is mountable on the mechanical oscillator and holds the flow conduit described in previous embodiments. In some implementations, the open profile interface and the mechanical oscillator are a unitary unit, and in some they are discrete and are fitted onto each other.

FIG. 8 is a diagrammatic representation for implementing some components of a Coriolis flow meter 820 which includes the mechanical oscillator 830 providing a dual parallel linear framework which in this embodiment are a unitary unit with the open profile interface 840 configured to hold two flow conduits (not shown), and the mounting features for the sensors and actuators 850. It shall be noted that this particular design is fully symmetrical with regard to the horizontal plane.

FIG. 9 is yet another configuration for implementing some components of a Coriolis flow meter 900. In this configuration the flow conduit 910 is inserted into the open profile interface 920 forming a singular linear framework. The oscillator 930 is defined by steel inserts on either side of the flow conduit and fully integrated into the open profile interface, which furthermore includes mounting features 940 to couple the sensors 950 and the actuator 960 at well defined positions.

As would be appreciated by those skilled in the art, the open profile interface of FIG. 7-FIG. 9 is disposed in close physical contact with the flow conduit of the Coriolis flow meter, but is not in direct contact with the fluid, that is subject to measurement for mass flow rate.

The embodiments described herein above may include additional attachments, clamps and fixtures, such as but no limited to screws, bolts and nuts, adhesives, or may have snap-in grooves and the like to position the mechanical oscillator sub-system, the fluid flow sub-system, and the electronics circuitry.

It would be appreciated by those skilled in the art that the embodiments of FIG. 3-FIG. 9 are provided by way of examples, and another pre-defined shapes for the mechanical oscillator and flow conduit may be configured based on use environment.

Figure 10:
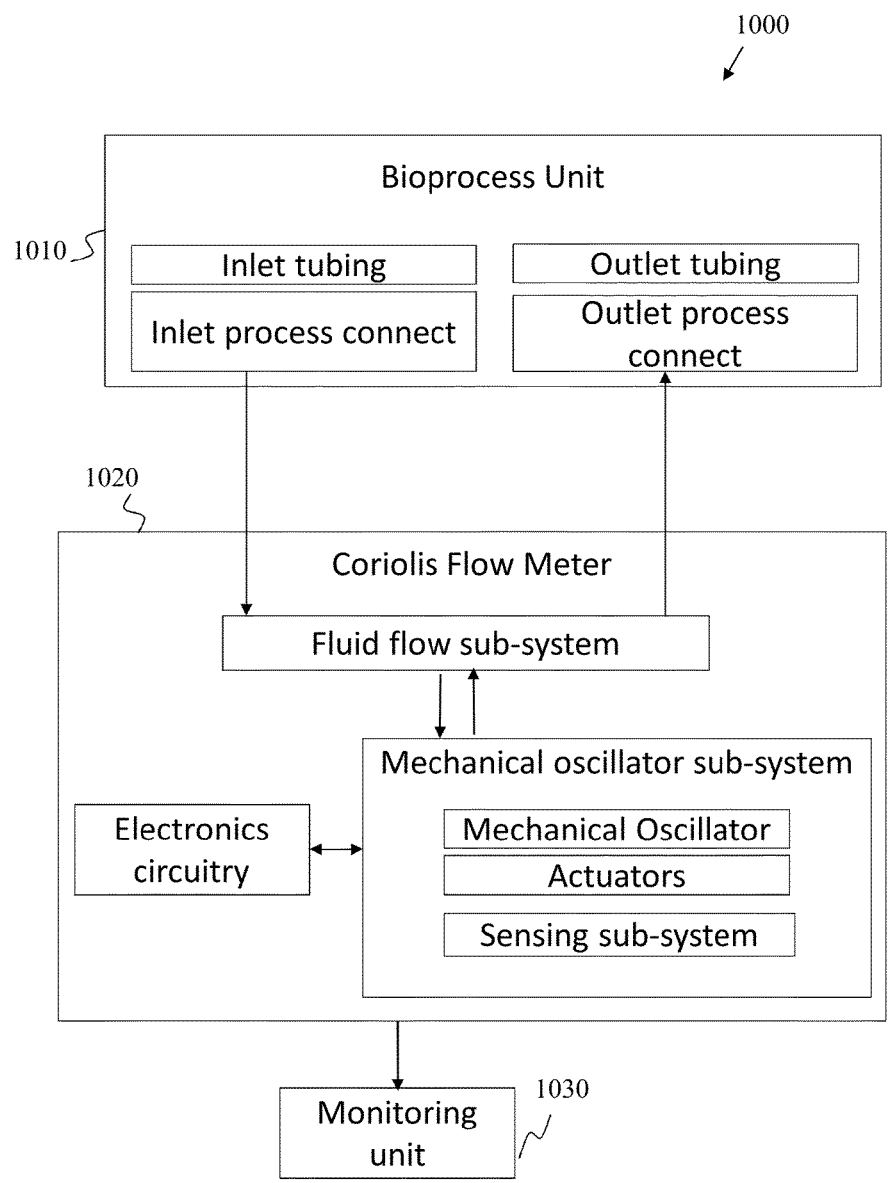
FIG. 10 is a block diagram representation of an embodiment of a bioprocessing system that uses the Coriolis flow meter of FIG. 2, in accordance with some.

In another aspect, FIG. 10 provides a diagrammatic representation for a bioprocessing system 1000 for monitoring one or more properties of a fluid including fluid flow used in a bioprocess of a bioprocess unit 1010. The bioprocess unit 1010, as shown, includes the inlet tubing with an inlet process connect, and an outlet tubing with an outlet process connect. The other aspects of the bioprocess unit 1010 which involve the actual process are not shown here to limit the discussion to the aspects related to monitoring of the one or more properties of the fluid including fluid flow.

As shown in FIG. 10, a Coriolis flow meter 1020 is coupled to the inlet process connect and the outlet process connect of the bioprocess unit 1010. The Coriolis flow meter 1020 referred herein has been described hereinabove in reference with FIGS. 2-9, and includes same components with the same functions. The bioprocessing system 1000, further includes a monitoring unit 1030 that is configured for receiving the measurements representative of the one or more fluid properties of the fluid, from the Coriolis flow meter 1020 and configured to use the measurements to control the bioprocess in the bioprocess unit 1010. All aspects of the Coriolis flow meter of FIGS. 2-9 are applicable in the embodiment of the bioprocessing system 1000.

Figure 11:
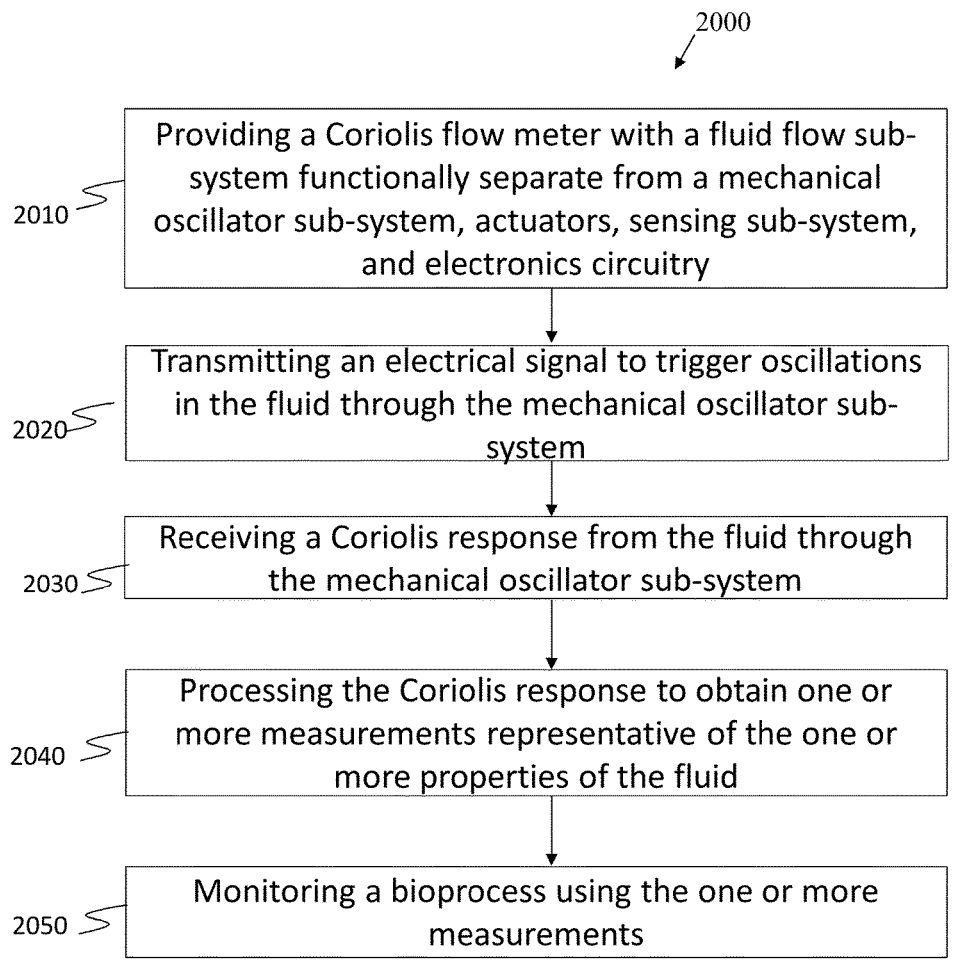
FIG. 11 illustrates a flowchart showing steps for a method for measuring one or more properties of a fluid including fluid flow using a Coriolis flow meter, in accordance with some embodiments.

In yet another aspect, FIG. 11 illustrates a flowchart 2000 showing steps for a method for measuring one or more properties of a fluid including fluid flow using a Coriolis flow meter. The Coriolis flow meter referred herein has been described previously in reference to FIGS. 2-9. The method includes a step 2010 for providing the Coriolis flow meter with a fluid flow sub-system functionally separate from a mechanical oscillator sub-system, actuators, sensing sub-system and electronics circuitry. The method includes a step 2020 for transmitting an electrical signal to trigger oscillations in the fluid through the mechanical oscillator sub-system. The method includes a step 2030 for receiving a Coriolis response from the fluid through the mechanical oscillator sub-system; a step 2040 for processing the Coriolis response to obtain one or more measurements representative of the one or more properties of the fluid including fluid flow, and a step 2050 for monitoring a bioprocess using the one or more measurements.

In yet another aspect, FIG. 12 illustrates a flowchart 3000 showing steps for a method for monitoring one or more properties of a fluid including fluid flow in a bioprocess of a bioprocessing system. The method includes a step 3010 for coupling an inlet tubing and an outlet tubing of a bioprocess with a Coriolis flow meter using process connects. The Coriolis flow meter referred herein has been described previously in reference to FIGS. 2-9. The method includes a step 3020 for transmitting an electrical signal to trigger oscillations in the fluid through the mechanical oscillator sub-system. The method includes a step 3030 for receiving a Coriolis response from the fluid through the mechanical oscillator sub-system. The method further includes a step 3040 for processing the Coriolis response to obtain one or more measurements representative of the one or more properties of the fluid including fluid flow, and a step 3050 for monitoring the bioprocess using the one or more measurements.

In yet another aspect, the beforementioned functional separation furthermore allows for the fluid containment of the superordinate process to be employed as fluid flow subsystem in the Coriolis flow meter, e.g. a pre-sterilized flexible tubing. FIG. 13 is another example embodiment 4000, where the fluid flow subsystem 4040 of the Coriolis flow meter 4020 is an integral part of a bioprocess unit 4010 itself.

Referring to FIG. 13, the bioprocess unit 4010 is used for growing cell culture in a bio-reactor 4060, and includes a media (block 4050) which typically includes a fluid mixture of nutrients required for cell growth in the bio-reactor 4060. The nutrient fluid is transferred to the bio-reactor 4060 through the fluid flow sub-system 4040, which is a flow conduit, and part of the Coriolis flow meter 4020.

It would be appreciated by those skilled in the art that the bioprocess unit may include several other components, for either upstream and downstream process input to or outputs from the bioreactor 4060. For example, along with media which is primarily a fluid mixture of nutrients, a gas chamber that includes a fluid mixture of gases such as oxygen, nitrogen or carbon di-oxide may also be included that are required for the cell growth in the bioreactor 4060. In this case, another flow conduit would be used to deliver the gases to the bioreactor, and this flow conduit would be then a part of the Coriolis flow meter, similar to the embodiment of FIG. 13. The embodiment of FIG. 13 also covers downstream processes like waste collection, cell chromatography, cell harvesting, cell clarification, cell purification and the like where the flow conduit (and therefore, the fluid flow subsystem) would be between the bio-reactor and a chamber that receives the output from the bio-reactor for any of the downstream processes. The bio-reactor referred herein may be any of a stir tank, wave, single-use or multi-use bio-reactor, or any other type, that is used in the field of bioprocessing. Thus, the embodiment of FIG. 13, due to the modular configurations described in referenced to FIG. 2, and other embodiments hereinabove, allows a flow conduit of a bioprocess unit to be shared as the fluid flow subsystem of the Coriolis flowmeter, thus optimizing and simplifying the process of measurement of the properties of the fluid.

The different aspects described herein allow for optimal material choice for the mechanical oscillator with regards to the frequencies of the different oscillation modes, in order to achieve a high level of accuracy in the measurements. Furthermore, the design and material selection for the mechanical oscillator ensures that the impact of material choice for the flow conduit, on the oscillation behavior is limited due to the functional separation of the mechanical oscillator sub-system and the fluid flow sub-system in the embodiments described hereinabove. Thus, the oscillation characteristics are dominated by the material and the geometry of the mechanical oscillator, and only marginally influenced by the fluid containment, which improves the measurements for the fluid.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A Coriolis flow meter for measuring one or more properties of a fluid, the Coriolis flow meter comprising:
   a fluid flow sub-system configured to provide a flow path for the fluid;

a mechanical oscillator sub-system disposed in proximity to the fluid flow sub-system, wherein the mechanical oscillator sub-system and the fluid flow sub-system are functionally separate, and wherein the mechanical oscillator sub-system is configured to induce oscillations in the fluid flow sub-system, and further configured to detect a Coriolis response from the fluid, the mechanical oscillator sub-system comprising:
    a mechanical oscillator linked with the fluid flow sub-system configured to provide a closed-loop arrangement for transmission of oscillations to the fluid and receipt of the Coriolis response from the fluid,
    one or more actuators for generating oscillations in the mechanical oscillator, and
    a sensing sub-system configured to receive the Coriolis response through the mechanical oscillator from the fluid; and
an electronics circuitry coupled to the mechanical oscillator sub-system, and configured to trigger the one or more actuators and the sensing sub-system, and configured to process the Coriolis response received from the sensing sub-system to generate one or more measurements representative of one or more fluid properties of the fluid.

2. The Coriolis flow meter of claim 1 wherein the fluid flow sub-system comprises a flow conduit to retain the fluid, and wherein the one or more actuators are directly mounted on the mechanical oscillator.

3. The Coriolis flow meter of claim 2 wherein the mechanical oscillator sub-system comprises an open profile interface to hold the flow conduit.

4. The Coriolis flow meter of claim 3 wherein the open profile interface comprises a plurality of receptacles to hold the flow conduit.

5. The Coriolis flow meter of claim 3 wherein the open profile interface and the mechanical oscillator are a unitary unit.

6. The Coriolis flow meter of claim 2 wherein the flow conduit is disposable.

7. The Coriolis flow meter of claim 1 further comprising a platform to receive the mechanical oscillator sub-system and the fluid flow sub-system.

8. The Coriolis flow meter of claim 1 wherein the mechanical oscillator sub-system, the fluid flow sub-system and the electronics circuitry are modular and allow modular integration.

9. The Coriolis flow meter of claim 2 wherein the flow conduit is made of at least one of polymer, metal, silicone or glass.

10. The Coriolis flow meter of claim 1 wherein the mechanical oscillator sub-system provides a linear framework on which the fluid flow sub-system is mechanically attached.

11. The Coriolis flow meter of claim 1 wherein the mechanical oscillator sub-system provides a U-shape framework on which the fluid flow sub-system is mechanically attached.

12. The Coriolis flow meter of claim 1 wherein the one or more measurements are used for monitoring a bioprocess.

13. The Coriolis flow meter of claim 1 wherein the one or more properties comprise at least one of mass flow rate, density, or temperature of the fluid.

14. A Coriolis flow meter for measuring one or more fluid properties of a fluid, the Coriolis flow meter comprising:
    a fluid flow sub-system configured to provide a flow path for the fluid;
    a mechanical oscillator sub-system disposed in proximity to the fluid flow sub-system, wherein the mechanical oscillator sub-system is configured to induce oscillations in the fluid flow sub-system, and to detect a Coriolis response generated in the fluid, the mechanical oscillator sub-system comprising:
        an open profile interface linked to the fluid flow sub-system to provide a closed-loop arrangement for transmission of oscillations to the fluid flow sub-system and receipt of the Coriolis response from the fluid flow sub-system,
        one or more actuators for generating oscillations in the open profile interface, and
        a sensing sub-system configured to receive the Coriolis response from the fluid flow sub-system through the open profile interface; and
    an electronics circuitry coupled to the mechanical oscillator sub-system, and configured to trigger the one or more actuators and the sensing sub-system, and configured to process the Coriolis response received from the sensing sub-system to generate one or more measurements representative of one or more fluid properties of the fluid,
    wherein the mechanical oscillator sub-system and the fluid flow sub-system are functionally separate.

15. The Coriolis flow meter of claim 14 wherein the fluid flow sub-system comprises a flow conduit to retain the fluid, and wherein the one or more actuators are directly mounted on the mechanical oscillator.

16. The Coriolis flow meter of claim 15 wherein the open profile interface holds the flow conduit.

17. The Coriolis flow meter of claim 14 wherein the one or more fluid properties comprise at least one of mass flow rate, density, or temperature of the fluid.

18. A bioprocessing system for monitoring one or more fluid properties of a fluid used in a bioprocess unit, the bioprocessing system comprising:
    an inlet tubing and an outlet tubing of the bioprocess unit, wherein the inlet tubing is connected to an inlet process connect, and the outlet tubing is connected to an outlet process connect;
    a Coriolis flow meter coupled to the inlet process connect and the outlet process connect, wherein the Coriolis flow meter comprises:
        a fluid flow sub-system to receive and retain the fluid in a flow conduit,
        a mechanical oscillator sub-system comprising:
            a mechanical oscillator linked with the fluid flow sub-system in a closed-loop arrangement, one or more actuators, and a sensing sub-system, wherein the mechanical oscillator sub-system and the fluid flow sub-system are functionally separate, and
        an electronics circuitry coupled to the mechanical oscillator sub-system, and configured for obtaining one or more measurements representative of the one or more fluid properties of the fluid; and
    a monitoring unit configured for receiving the measurements representative of the one or more fluid properties of the fluid, and configured to use the measurements to control the bioprocess.

19. The bioprocessing system of claim 18 wherein the mechanical oscillator sub-system, the fluid flow sub-system and the electronics circuitry are modular and allow modular integration.

20. The bioprocessing system of claim 18 wherein the fluid flow sub-system comprises a flow conduit to retain the fluid.

21. The bioprocessing system of claim 19 wherein the mechanical oscillator sub-system, comprises an open profile interface to hold the flow conduit.

22. The bioprocessing system of claim 21 wherein the open profile interface comprises a plurality of receptacles to hold the flow conduit.

23. The bioprocessing system of claim 21 wherein the open profile interface and the mechanical oscillator are a unitary unit.

24. The bioprocessing system of claim 18 wherein the one or more fluid properties comprise at least one of mass flow rate, density, or temperature of the fluid.

25. A method for measuring one or more fluid properties of a fluid using a Coriolis flow meter, the method comprising:
   providing a fluid flow sub-system to retain a fluid in a flow conduit;
   providing a mechanical oscillator sub-system comprising:
      a mechanical oscillator linked with the fluid flow sub-system in a closed-loop arrangement, one or more actuators, and a sensing sub-system, wherein the mechanical oscillator sub-system and the fluid flow sub-system are functionally separate;
   providing an electronics circuitry coupled to the mechanical oscillator sub-system;
   transmitting an electrical signal to trigger oscillations in the fluid through the mechanical oscillator sub-system;
   receiving a Coriolis response from the fluid through the mechanical oscillator sub-system; and
   processing the Coriolis response to obtain one or more measurements representative of the one or more fluid properties of the fluid.

26. The method of claim 25 further comprising monitoring a bioprocess using the one or more measurements.

27. The method of claim 25 wherein the mechanical oscillator sub-system comprises an open profile interface for holding the flow conduit, and wherein the one or more actuators are directly mounted on the mechanical oscillator.

28. The method of claim 25 wherein the one or more fluid properties comprise at least one of mass flow rate, density, or temperature of the fluid.

29. A method for monitoring one or more fluid properties of a fluid in a bioprocess of a bioprocessing system, the method comprising:
   coupling an inlet tubing and an outlet tubing of a bioprocess with a Coriolis flow meter using process connects, wherein the Coriolis flow meter comprises:
      a fluid flow sub-system to retain the fluid in a flow conduit,
      a mechanical oscillator sub-system comprising:
         a mechanical oscillator linked with the fluid flow sub-system in a closed-loop arrangement, one or more actuators, and a sensing sub-system, wherein the mechanical oscillator sub-system and the fluid flow sub-system are functionally separate, and
         an electronics circuitry coupled to the mechanical oscillator sub-system;
   transmitting an electrical signal to trigger oscillations in the fluid through the mechanical oscillator sub-system;
   receiving a Coriolis response from the fluid through the mechanical oscillator sub-system;
   processing the Coriolis response to obtain one or more measurements representative of the one or more fluid properties of the fluid; and
   monitoring the bioprocess using the one or more measurements,
   wherein the one or more fluid properties comprise at least one of mass flow rate, density, or temperature of the fluid.

30. The method of claim 29 wherein the mechanical oscillator sub-system comprises an open profile interface for holding the flow conduit.

31. A bioprocessing system for monitoring one or more fluid properties of a fluid used in a bioprocess unit, the bioprocessing system comprising:
   a fluid flow sub-system to transfer a fluid using a flow conduit in a bioprocess of the bioprocess unit;
   a mechanical oscillator sub-system comprising:
      a mechanical oscillator linked with the fluid flow sub-system in a closed-loop arrangement, one or more actuators, and a sensing sub-system, wherein the mechanical oscillator sub-system and the fluid flow sub-system are functionally separate, and
      an electronics circuitry coupled to the mechanical oscillator sub-system, and configured for obtaining one or more measurements representative of the one or more fluid properties of the fluid, and
   wherein the fluid flow sub-system, and the mechanical oscillator sub-system form a Coriolis flow meter; and
   a monitoring unit configured for receiving the measurements representative of the one or more fluid properties of the fluid, and configured to use the measurements to control the bioprocess.

* * * * *